(12) United States Patent
Walthoe

(10) Patent No.: US 6,450,016 B1
(45) Date of Patent: Sep. 17, 2002

(54) STYLUS SUPPORT ASSEMBLY WITH FLEXED LIGAMENT HINGE

(75) Inventor: Christopher Walthoe, Leicester (GB)

(73) Assignee: Taylor Hobson Limited, Leicester (GB)

(*) Notice: Subject to any disclaimer, the term of this patent is extended or adjusted under 35 U.S.C. 154(b) by 0 days.

(21) Appl. No.: 09/463,583

(22) PCT Filed: Jun. 30, 1998

(86) PCT No.: PCT/GB98/02274
§ 371 (c)(1),
(2), (4) Date: May 23, 2000

(87) PCT Pub. No.: WO99/06792
PCT Pub. Date: Feb. 11, 1999

(30) Foreign Application Priority Data

Jul. 31, 1997 (GB) .............................................. 9716295

(51) Int. Cl.$^7$ ................................................. G01B 7/34
(52) U.S. Cl. ......................................... 73/105; 73/866.5
(58) Field of Search ........................ 73/104, 105, 866.5

(56) References Cited

U.S. PATENT DOCUMENTS

| | | | | |
|---|---|---|---|---|
| 4,574,625 A | * | 3/1986 | Olasz et al. ................... | 73/105 |
| 4,669,300 A | * | 6/1987 | Hall et al. ..................... | 73/105 |
| 5,847,270 A | * | 12/1998 | Nettleton ....................... | 73/105 |

FOREIGN PATENT DOCUMENTS

| | | | | |
|---|---|---|---|---|
| GB | 1085653 | * | 3/1964 | ................... 73/105 |

* cited by examiner

*Primary Examiner*—Daniel S. Larkin
(74) *Attorney, Agent, or Firm*—Oblon, Spivak, McClelland, Maier & Neustadt, P.C.

(57) ABSTRACT

A stylus support assembly for a gauge for a metrological instrument which has a main gauge body and a mounting block for supporting a stylus. The main gauge body and the mounting block each have first and second ends, with the first ends facing in the same direction. A resilient ligament connects the first ends which are arranged at an angle to one another so that the ligament biases the mounting block and thus the stylus to extend at an angle to the main gauge body, thereby providing a biasing force to bias the stylus against the workpiece.

14 Claims, 3 Drawing Sheets

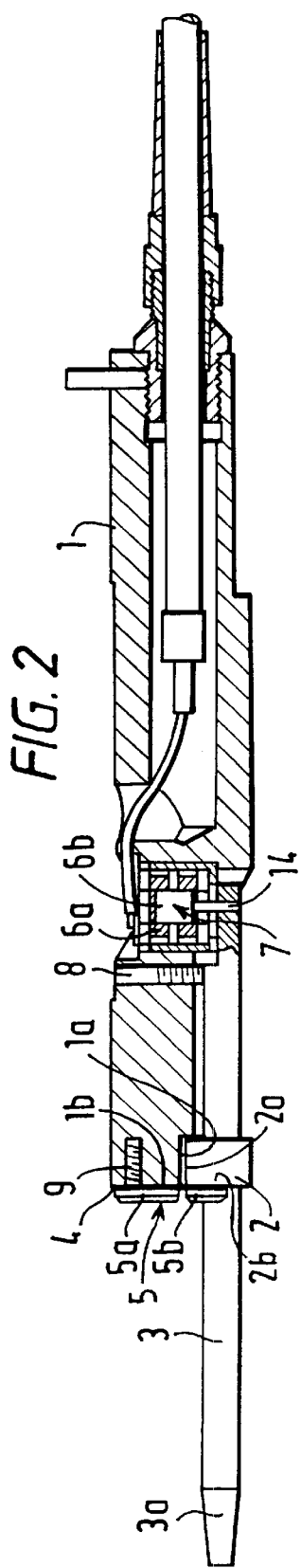
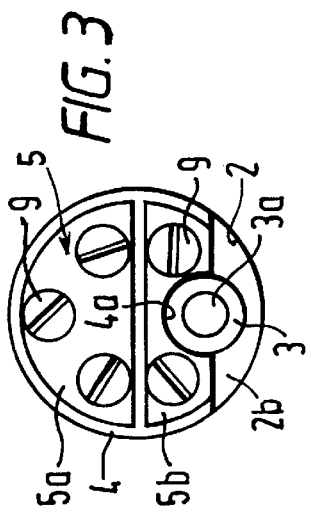
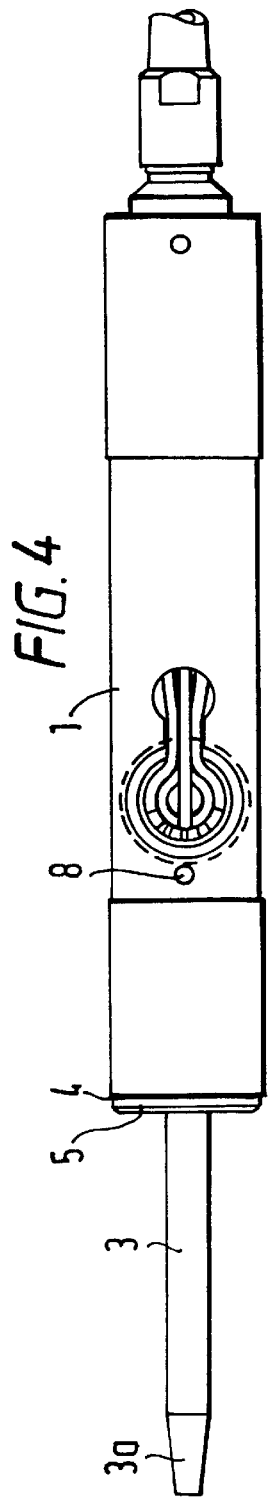

STYLUS SUPPORT ASSEMBLY WITH FLEXED LIGAMENT HINGE

BACKGROUND OF THE INVENTION

1. Field of the Invention

The present invention relates to a stylus support assembly for a gauge for a metrological instrument for measuring surface form such as roundness and/or surface finish parameters, such as surface texture or roughness.

2. Discussion of the Background

Metrological instruments are known in which a stylus is mounted on an arm so as to follow the surface form or finish of a workpiece during relative movement of the arm and the workpiece. A transducer outputs a signal in accordance with movement of the stylus relative to the arm. Metrological instruments are normally made so that the stylus is removable and replaceable. This is to allow a different stylus to be fitted to the same machine. This may be necessary to allow the stylus length to be changed or to change the particular stylus tip, in accordance with the workpiece being measured and the accuracy required. However, the constant insertion and removal of different styli means that the gauge must be constantly recalibrated and leads to inaccurate readings from the transducer if recalibration is not carried out.

SUMMARY OF THE INVENTION

According to one aspect of the present invention there is provided a stylus support assembly which supports a stylus in a more stable and reliable manner.

According to one aspect of the present invention, there is further provided a stylus support assembly for supporting a stylus for use in a gauge for a metrological instrument, the support assembly comprising two members resiliently connected so as to provide a stylus force in use of the assembly to enable the stylus tip to be pressed against the surface of the body to be measured and keep contact with that surface.

The members may be connected at an angle which is typically within a range of 2° to 3° from the perpendicular to the gauge axis. The stylus force can be changed by changing the resilience and/or the angle of the connecting means.

In another aspect, the present invention provides a one-piece stylus. A stylus tip can be mounted at the front end. A shaft for holding a core of a transducer ferrite, can be located at the rear end of the stylus.

In one aspect, the invention provides a particular construction of stylus support means to improve stylus stability.

A stylus support assembly embodying the invention is easy to manufacture and assemble.

BRIEF DESCRIPTION OF THE DRAWINGS

Embodiments of the invention, given by way of non-limiting example, will now be described with reference to the accompanying drawings in which:

FIG. 2 shows a part-sectional view of a stylus support assembly according to the present invention;

FIG. 3 shows the front end of the stylus support assembly shown in FIG. 2;

FIG. 4 shows a plan view of the stylus support assembly;

DESCRIPTION OF THE PREFERRED EMBODIMENTS

Figure 1:
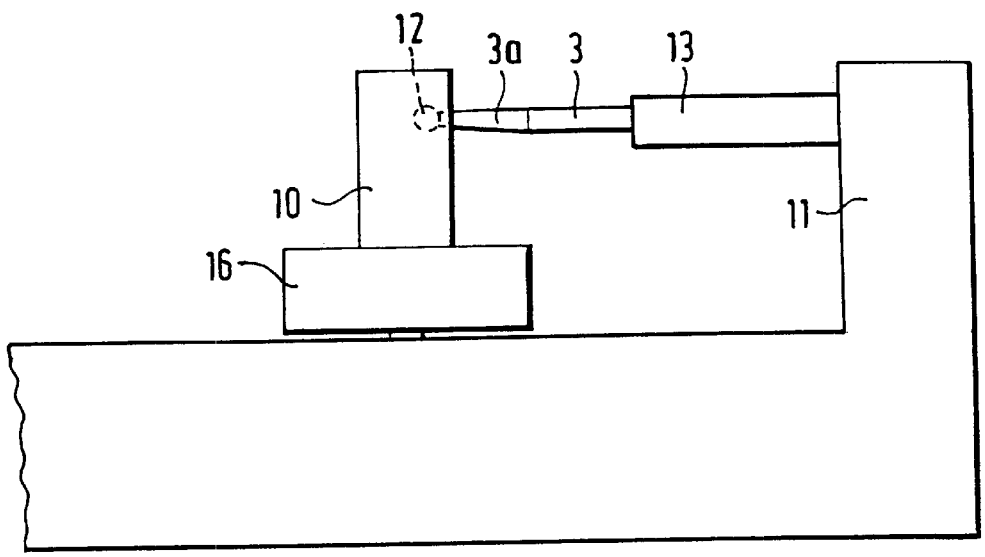
FIG. 1 is a schematic view of a metrological instrument embodying the invention.

FIG. 1 is a schematic view of a metrological instrument. A workpiece 10 is placed on a turntable 16. A gauge body 13 is mounted in conventional manner (for example by means of a carriage (not shown)) to a fixed column 11 so as to enable the gauge body to move transversely of the column, that is toward or away from the workpiece. The gauge body 13 may also be movable up and down the column to allow, for example, measurements to be made at different heights above the turntable 16. The gauge body which may have a diameter of, typically, 15 mm provides a stylus/support assembly to which a stylus 3 having a stylus tip 12 is pivotably mounted. In use, the gauge body is moved horizontally (that is toward the workpiece) to bring the stylus tip 12 into contact with the surface of the workpiece. Variations in the surface form and/or finish of the workpiece cause the stylus to pivot. This pivoting movement is detected in known manner by a linear variable differential transducer (LVDT) located within the gauge body 3. The output signal of the transducer is supplied to processing means (not shown), such as a personal computer, which obtains from the transducer output signal information about the surface form and/or finish of the workpiece.

FIGS. 2 and 3 illustrate in greater detail a stylus support assembly embodying the invention. The stylus support assembly comprises an elongate first member or main gauge body 1 which is typically formed of stainless steel and a second member or mounting block 2 which has a through aperture (not shown) through which the stylus 3 extends. The stylus 3 is held fixedly within the mounting block 2 by means of, for example, adhesive.

The mounting block 2 is typically formed of stainless steel and is generally cylindrical in shape and has an upper face 2a which is received with clearance in a recess 1a formed by a smaller diameter section of the main gauge body adjacent a front end face 1b thereof.

The front end face 1b of the main gauge body 1 is formed so as not to be at 90° to the longitudinal axis of the main gauge body but rather to be at an angle of, typically, approximately 87 to 88°, in this example 87.5°, thereto so that the portion of the end face 1b remote from the mounting block 2 projects beyond the mounting block. The angling of the front end face 1b of the main gauge body may be achieved by, for example, conventional grinding and lapping processes.

The mounting block 2 is resiliently connected to the main gauge body by means of a resilient connecting member or ligament 4 which is fixedly secured to the front end face 1b of the main gauge body 1 and to the mounting block 2 by means of a two-piece ligament clamp 5, as shown in FIG. 4.

As can most clearly be seen from FIG. 3, the ligament 4 is a plate-like member in the form of a major segment of a circle having a recess 4a for accommodating the stylus 3 while the two-piece clamp is provided by a first generally semi-circular clamping member 5a and a second clamping member 5b which differs in shape from the first clamping member 5a by being modified to fit the shape of the lower section of the ligament. The first clamping member 5a is secured to the end face 1b of the main gauge body 1 by means of screws 9 (three are shown in FIG. 3) which extend through holes in the first clamping member 5a and the ligament 4. The second clamping member 5b is similarly secured to an end face 2b of the mounting block 2 by screws 9 (two are shown in FIG. 3).

The ligament 4 may be formed of, for example, beryllium copper while the clamping members 5a and 5b may be manufactured from stainless steel with a thickness of approximately 1.4 mm.

As can be seen from FIGS. 2 and 3, the ligament 4 extends across substantially the entire width of the end face 1b of the main gauge body 1 and across the width of the mounting block 2. The fact that the ligament 4 extends across the full width of the main gauge body should give greater stability for the stylus support assembly making twisting of the stylus less likely The mounting of the mounting block 2 to the main body 1 by the ligament 4 provides a small clearance between the mounting block and the recess 1a of the main gauge body across which, as can be seen from FIGS. 2 and 3, only the ligament 4 extends. This arrangement allows the mounting block 2, and thus the stylus 3 carried by the mounting block 2, to pivot relative to the main body about the free area of the ligament 4.

The angling of the end face 1b of the main body causes the ligament 4 to bias the front end 3a of the stylus 3 away from the main gauge body in FIG. 2 so as to provide a stylus force biassing the stylus tip downwardly in FIG. 2. As will be appreciated, when the gauge shown in FIG. 2 is mounted in the instrument shown schematically in FIG. 1, the gauge will be rotated through 90 about its longitudinal axis from the orientation shown in FIG. 2 so that the ligament 4 biasses the stylus in a direction out of the paper in FIG. 1, that is towards the workpiece 10.

This arrangement for providing the stylus force is relatively simple to assemble in contrast to the conventional spring biasing arrangements used in, for example, the Talyrond 300 manufactured by Taylor Hobson Limited, Leicester, England which can be extremely difficult to calibrate and to assemble within the gauge.

The stylus force provided by the ligament 4 may be adjusted by changing the thickness of the ligament or by selecting a different material with a different resilience.

It should be appreciated that the biasing force results from the fact that the end face 1b of the main gauge body 1 is at an angle to the end face 2b of the mounting block 2 and that a similar effect could be achieved by angling the end face 2b of the mounting block 2 rather than the end face 1b of the main gauge body 1 so that the end face 2b of the mounting block 2 and the end face 1a of the main gauge body 1 subtend an angle of less than 180° typically 177–178°.

Although the stylus 3 carried by the mounting block may be a conventional stylus, in this example the stylus is in the form of a one-piece body which may be formed of, for example, stainless steel and may be shorter than a conventional stylus having, typically, a length of 50 mm so as to minimise flexing.

Pivotal movement of the stylus 3 as it follows a workpiece surface during use of the gauge is detected conventionally by using a linear variable differential transducer (LVDT) 7. In the arrangement shown in FIG. 2, the coil 6a of the LVDT is mounted in a conventional manner within a recess provided in the main gauge body 1 while a ferrite core 6b of the LVDT is mounted, again in a conventional manner, to a shaft 14 projecting from the end of the stylus 3. In this example, the shaft 14 is formed from carbon fibre which is less affected by temperature changes than the materials previously used for forming the shaft and thus the dimensions of the shaft 14 and thus the location of the core 6b relative to the end of the stylus 3 do not alter significantly with changes in temperature so that the output of the LVDT 7 is less affected by temperature than would be the case if a conventional aluminum or steel shaft 14 was used.

The stylus support assembly shown in FIGS. 2 to 4 is assembled by first mounting the stylus 3 within the mounting block 2 and then coupling the mounting block 2 to the main gauge body 1 by means of the resilient ligament 4 and by clamping means 5 as discussed above. once the mounting block 2 has been coupled to the main gauge body 1, the ferrite core 6b needs to be mounted to the shaft 14.

As will be appreciated from the above, when the mounting block 2 is coupled to the main gauge support body 1, the stylus 3 is pushed into a position at an angle to the longitudinal axis of the main gauge body 1. The resulting offset from the centre of the stylus 3 to the main gauge body 1 is known from the angle of the angled front end face 1b.

In order to accurately locate the ferrite core 6b on the shaft 14, the stylus 3 and the main gauge body 1 are placed in respective conventional V groove fixtures mounted so that one of the V groove fixtures is movable along a micrometer screw thread relative to the other. The movable fixture is moved through an offset distance which is determined by the angle of the end face 1b to the gauge axis so that the stylus is held parallel to the longitudinal axis of the main gauge body. While the stylus 3 is held parallel to the longitudinal axis of the main gauge body, the ferrite core 6 is adjusted on the shaft 14 until the LVDT 7 provides a zero output reading. The ferrite core 6b is then fixed in position by, for example, cementing using medium viscosity cyanoacrylate.

The stylus support assembly 13 is then removed from the fixtures. The stylus returns to its angled position as it is no longer held parallel to the gauge body. A grub screw 8 located further towards the rear of the gauge body than the mounting block 2 is used to push the stylus 3 back to a position where the transducer reading is again zero. The grub screw is then released to allow the stylus tip to move by approximately 0.2 to 0.25 mm. The range of movement of the stylus tip is thus at ±0.2 to 0.25 mm which is within the linear range of the transducer. The upper end of the movement range is restricted by the recess 1a.

The stylus tip 12 can be replaceable and can be changed dependent on what component is being measured. Thus, for example, the free end 3a of the stylus 3 may be hollow so as to receive a shaft carrying the stylus tip 12 which shaft may be secured in place by a suitable adhesive. The tips can be manufactured from, for example, either synthetic ruby or tungsten carbide.

Figure 5:
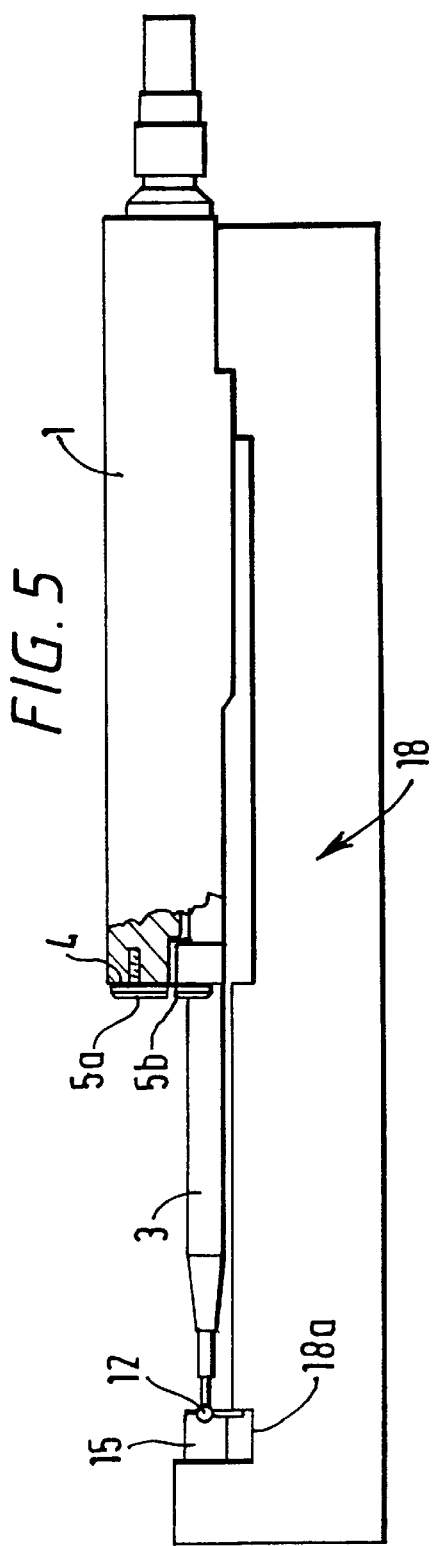
FIG. 5 shows an align met block, used to fit a stylus tip in the stylus support assembly shown in FIG. 3.
Figure 6:
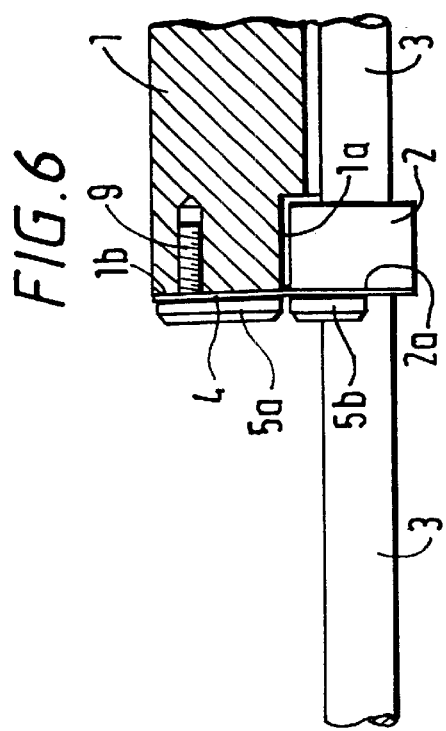
FIG. 6 shows an exaggerated enlarged view of part of the stylus shown in FIG. 2.

FIG. 5 shows an arrangement by which a stylus tip 12 may be correctly positioned within the free end 3a of the stylus 3.

The arrangement comprises a precision machined fixture 18 for accurately locating the stylus support assembly. A stylus tip alignment block 15 is mounted in a recess 18a at one end of the fixture 18. The recess is adapted to receive a number of different alignment blocks 15 each having a stylus tip receiving recess or datum face designed to accept and locate a particular size or diameter of stylus tip. In order to align the stylus tip 12, the correct alignment block 15 is first positioned in the recess 18a and then the stylus support assembly, with the stylus tip 12 loosely received on the free end 3a of the stylus, is located in the fixture so that the stylus tip is located against the alignment datum face.

The stylus tip 12 once aligned is then bonded in position using a suitable adhesive. A conventional thermo-softening adhesive such as a two-part epoxy resin, may be used. This has the advantage of allowing the stylus tip 12 to be removed and replaced by a different stylus tip simply by heating the free end 3a of the stylus 3 to soften the adhesive so as to allow manual removal of the stylus tip.

Although the gauge body and mounting block have been described as circular cross-section members, it will be appreciated that they may be of any suitable cross-section, for example rectangular. The ligament and clamps would be correspondingly shaped.

A side acting LVDT transducer 7 is shown in the drawings. However, any suitable transducer may be used with, for example, the transducer being arranged to respond to up and down pivotal movement of the stylus. Also, instead of a turntable, either the stylus assembly or the workpiece may be mounted to a slideway of conventional form to allow a stylus to be traversed across the workpiece surface to effect a measurement.

The stylus force providing arrangement described above is simpler to assemble than a conventional spring-biasing arrangement and is also cheaper. In addition, the use of a single piece stylus and its secure fixing within the mounting block prevents a user inadvertently removing or displacing the stylus. In addition, the materials used for the stylus and the ferrite core shaft 14 provide for increased thermal stability.

The above embodiment has been described by way of example and various modifications and alternatives will be apparent to those skilled in the art.

What is claimed is:

1. A stylus support assembly for a stylus for a gauge for a metrological instrument, comprising:
    a first member and a second member for supporting a stylus, said first and second members each having first and second ends, with the first ends facing in the same direction, and
    a resilient connection configured to connect the first ends, said first ends of the first and second members subtending therebetween an angle less than 180° so that the resilient connection biases the second member to extend at an angle to the first member.

2. A stylus support assembly as claimed in claim 1 wherein a stylus is held fixedly within the second member.

3. A stylus support assembly. as claimed in claim 2 wherein the length of the stylus is 50 mm.

4. A stylus support assembly as claimed in claim 1 wherein the first member has a maximum width of 15 mm.

5. A gauge for use in the metrological instrument including a transducer and stylus support assembly as claimed in claim 1.

6. A stylus support assembly for a metrological instrument, comprising:
    an elongate stylus having a first end for supporting a stylus tip and a second end for supporting one of a core and a coil of a transducer, and
    an elongate member for supporting the other of the core and the coil of the transducer,
        said stylus being secured to a mounting block having an end face adjacent and facing in the same direction as an end face of the elongate member,
        said elongate member and the mounting block being connected by a resilient plate extending over the end faces so that the stylus can pivot relative to the elongate member about a pivot axis defined by the resilient plate, and
        said end face of the elongate member being at an angle to the end face of the mounting block so that the resilient plate biases the stylus to extend at an angle to the length of the elongate member.

7. A stylus support assembly as claimed in claim 6 wherein the stylus is formed in one piece having a front end and a rear end with a support for the transducer core at the rear end.

8. A stylus support assembly as claimed in claim 7 wherein the means to support the transducer core is made of carbon fibre.

9. A stylus support assembly as claimed in claim 7 wherein the front end of the stylus supports the stylus tip.

10. A stylus support assembly as claimed in claim 9 wherein the tip is made from synthetic ruby or tungsten carbide.

11. A gauge for use in a metrological instrument including a transducer and a stylus support assembly as claimed in claim 6.

12. A stylus support assembly for a stylus for a gauge for a metrological instrument, comprising:
    a first member and a second member for supporting a stylus, said first and second members each having first and second ends, with the first ends facing in the same direction, and
    a resilient connection configured to connect the first ends, said first ends of the first and second members subtending therebetween an angle in the range of from 177° to 178° so that the resilient connection biases the second member to extend at an angle to the first member.

13. A stylus support assembly for a stylus for a gauge for a metrological instrument, comprising:
    a first member and a second member for supporting a stylus, said first and second members each having first and second ends, with the first ends facing in the same direction, and
    a resilient connection configured to connect the first ends, said first ends of the first and second members being at an angle to one another so that the resilient connection biases the second member to extend at an angle to the first member,
    wherein adjustment means are provided within the first member to adjust a stylus position relative to a longitudinal axis of the first member.

14. A method of providing a predetermined stylus force to a stylus for use in a gauge for a metrological instrument, the stylus being supported by a stylus support assembly including a first member arid a second member, said first and second members each having first and second ends with the first ends facing in the same direction, said method comprising the steps of:
    forming the first ends of the first and second members at an angle to each other,
    connecting the first and second members at the respective first ends by a resilient connection member, and
    forcing the second member to extend at an angle to the first member.

* * * * *

UNITED STATES PATENT AND TRADEMARK OFFICE
CERTIFICATE OF CORRECTION

PATENT NO.   : 6,450,016 B1
DATED        : September 17, 2002
INVENTOR(S)  : Walthoe It is certified that error appears in the above-identified patent and that said Letters Patent is hereby corrected as shown below:

<u>Title page,</u>
Item [22], should read:

-- [22]  PCT Filed:  Jul. 30, 1998 --

Signed and Sealed this

Twenty-first Day of January, 2003

JAMES E. ROGAN
*Director of the United States Patent and Trademark Office*